L. B. WHIPPLE.
SHEET METAL SHEARS.
APPLICATION FILED FEB. 21, 1919.

1,353,367.

Patented Sept. 21, 1920.
2 SHEETS—SHEET 1.

INVENTOR
Leland B. Whipple
By his Attorney
Nelson W. Howard

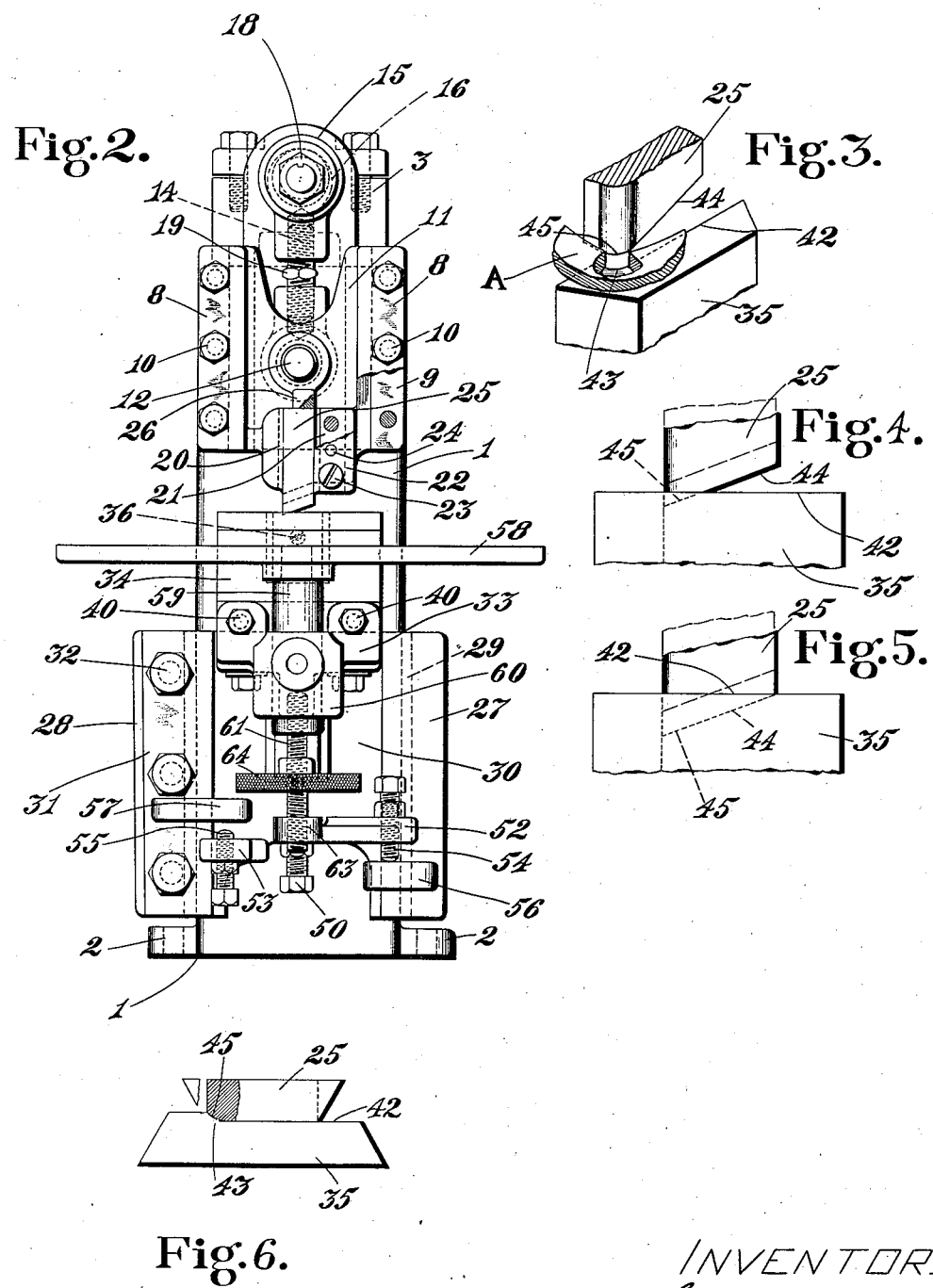

UNITED STATES PATENT OFFICE.

LELAND B. WHIPPLE, OF ROCHESTER, NEW YORK, ASSIGNOR TO FITZ-EMPIRE DOUBLE PIVOT LAST COMPANY, OF AUBURN, MAINE, A CORPORATION OF MAINE.

SHEET-METAL SHEARS.

1,353,367.  Specification of Letters Patent.  Patented Sept. 21, 1920.

Application filed February 21, 1919. Serial No. 278,430.

*To all whom it may concern:*

Be it known that I, LELAND B. WHIPPLE, a citizen of the United States, residing at Rochester, in the county of Monroe and State of New York, have invented certain Improvements in Sheet-Metal Shears, of which the following description, in connection with the accompanying drawings, is a specification, like reference characters on the drawings indicating like parts in the several figures.

The present invention relates to machines for cutting sheet metal, and more particularly, though not exclusively, for cutting out sheet metal patterns for boot and shoe uppers or soles.

The machines at present in use for cutting out sheet metal patterns comprise a cutter having a straight cutting edge which coöperates with the straight cutting edge of an anvil or stationary knife, and the two are arranged relatively at an inclination so that the cutting edges effect a shear cut. Machines of this general type may be advantageously employed in cutting the metal along straight lines, and, in the hands of experienced attendants, may develop fairly satisfactory results in rounding convex curves in metal sheets. Where, however, the curves to be cut in the metal sheets are concave, much difficulty is experienced with this type of machine, and the attendant is called upon to take a great many small chops or cuts along the proposed concave curve with the result that the edge of the concave is made up of a number of straight cuts which present uneven, jagged and rough edges requiring in many cases hand finishing to bring the pattern into the required satisfactory condition for use.

An important feature of the present invention, therefore, consists in providing the opposed cutting members with cutting edges having coöperating straight and curved portions so that when a straight or convex line of cut is to be made in a metal sheet the straight inclined cutting edges may be operatively related to effect the purpose, and when a concave line is to be cut the cutting members may be so related that the curved portions of the cutting edges may effect the cut. This feature of the invention may be carried into effect by variously contrived means, one good practical form being indicated for purposes of description.

More broadly stated, the invention provides opposed cutting members, and means for operating them to effect the cut by different portions thereof, or to exclude different portions thereof from cutting coöperation at will. The invention, for example, thus avoids the necessity of frequently grinding a pair of straight cutters which are being used on a short cut by providing for distribution of the work over all portions of the cutting edges.

In the present instance one of the cutting members is power operated through a predetermined path and has a slanting or inclined cutting edge formed of a convex curved portion and a straight portion preferably tangential thereto, while the other or anvil cutting member has a cutting edge formed of a concave curved portion to coöperate with the convex curved portion of the other member while cutting a concave curve in a metal sheet and has a straight cutting edge likewise preferably tangential to the concave curved portion to coöperate with the straight cutting portion of the power operated member while cutting along straight or convex lines.

In order that the two cutting members may be differently related from time to time to cut either along straight and convex lines or along concave lines, another important feature of the invention consists in means for changing the relation of the cutting members at will during the continued operation of the machine, so that either the straight portions of the cutting edges of the two cutting members may be made effective, or the curved cutting portions may be brought into operative relation selectively as the lines of cut in the pattern to be produced may dictate. This feature of the invention may be variously contrived but in the present instance the power driven member is reciprocated in a path of less extent than the depth of the relative inclination of the two cutting members, and the other cutting member is movable to different positions during the operation of the machine to cause either the straight or the curved portions of the cutting edges of the two members to be brought into cutting relation.

The above and other features of the invention and novel combinations of parts will be hereinafter described in connection with the accompanying drawings and then set forth in the claims.

In the drawings:

Fig. 2 is a front elevation of the machine looking from the left, Fig. 1, some of the parts being broken away for clearness of illustration;

Fig. 3 is an enlarged detail of portions of the cutting members, showing more particularly the relatively inclined cutting edges of the two members;

Fig. 4 is a detail front elevation showing the relation of the two cutting edges when the members are positioned for cutting concave curved portions in a metal sheet, the upper cutting member being at the lower limit of its stroke;

Fig. 5 is a view similar to Fig. 4 showing the two members positioned for cutting straight or convex portions in a metal sheet, the upper member being at the lower limit of its stroke;

Fig. 6 is an enlarged detached plan view showing the two cutting members, parts being broken away to show the coöperative relation of the convex and concave portions of the cutting edges.

Figure 1:
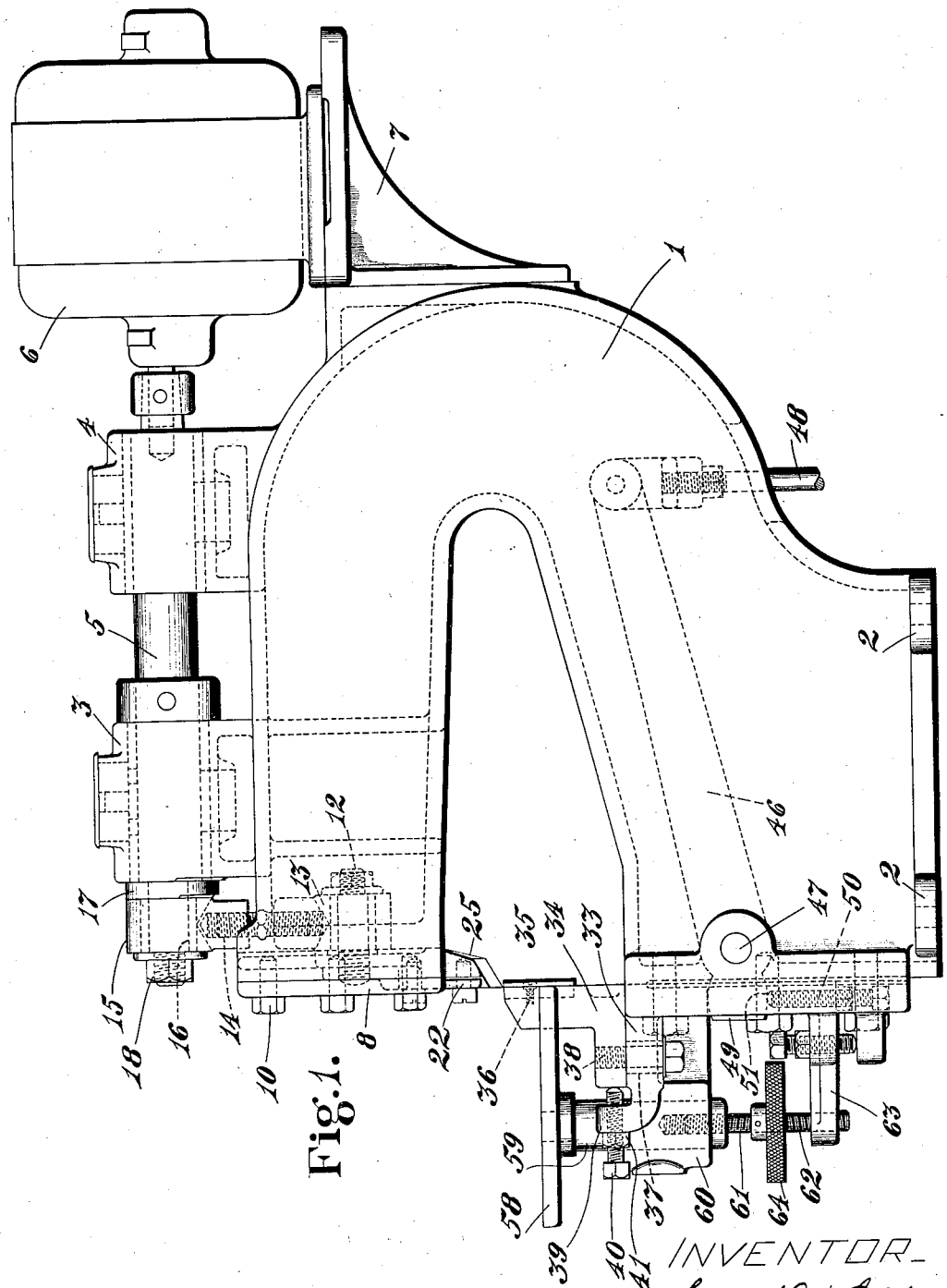
Figure 1 is a side elevation of a machine containing the present invention, the treadle rod being broken away.

The frame of the machine may be of appropriate character for supporting the operating parts and in the present instance it is formed as a goose-neck or curved arm 1, having at its base the lugs 2 by which it may be secured to a supporting stand or table at an appropriate height.

The frame 1 is provided with suitable bearings 3, 4, for the shaft 5 which may be rotated by suitable connections with an appropriate source of power. In the present instance the power for rotating the shaft 5 is derived from a motor 6 mounted on a bracket 7 secured to the machine frame.

The front portion of the frame 1 is provided with guide-ways in which is mounted the knife carrying slide operatively connected to the shaft 5 for reciprocating movement. In this instance of the invention the guides are formed by the cap piece 8 secured to the front face plate 9, Fig. 2, by suitable means such as the bolts 10, and in the guideways thus provided the knife-carrying slide 11 is mounted. The slide 11 carries a pin 12 on which is loosely mounted the sleeve 13. Extending upwardly from the sleeve 13 is the right and left screw-threaded pitman 14 which forms the connection between the sleeve 13 and a sleeve 15 loosely mounted on the eccentric 16 secured to the shaft 5, the construction being such that upon rotation of the shaft 5 appropriate reciprocating movement will be imparted to the knife-carrying slide 11. Between the sleeve 15 and the front face of the bearing 3 is a spacing member 17, and the front end portion of the shaft 5 is reduced in diameter and threaded for the reception of a nut 18 by which the sleeve 15 is held upon the eccentric 16. The eccentric 16 may be variously contrived but in the present instance of the invention it is preferably formed as a part separate from the shaft 5 and splined thereto, the construction being such that upon rotation of the shaft 5 the eccentric 16 imparts to the knife-carrying slide a reciprocating movement in a predetermined path. If desired, the right and left screw-threaded pitman 14 may have a slabbed off portion 19 by which the pitman may be adjusted to appropriately fix the path of reciprocating movement of the knife-carrying slide 11.

The knife-carrying slide 11 is provided with suitable clamping means for one of the cutting members. In the present instance the knife-carrying slide 11 has the dove-tail guide-way 20 which may be integrally formed with the slide 11 and an opposed dove-tail guide-way 21 to which may be secured the cap plate 22 by suitable means such as the screws 23, a dowel pin 24 serving to properly position the parts to clamp between them the dove-tail edge portions of the power operated cutting member 25, the construction of which will more fully appear. Secured to or formed integral with the slide 11 is a lug or stop 26 against which the upper end of the cutting member 25 may rest when the parts are in assembled position to thereby take up the thrust of the cutting member 25 as it performs its cutting stroke.

The lower portion of the goose-neck frame 1 is provided with suitable guides 27 and 28 provided with dove-tail ways 29 to receive corresponding dove-tail portions of the slide 30 carrying the cutting member opposed to the power operated cutting member 25. In the present instance the guide 27 may be formed integral with the goose-neck frame 1 while the guide 28 may be provided with a cap 31 secured to the guide 28 by suitable means, such as the bolts 32, the construction being such that the slide 30 may be moved longitudinally in its guides for a purpose that will presently appear.

The slide 30 has an outwardly projecting arm 33, Fig. 1, on which is adjustably mounted the support 34 for the lower cutting member 35 which may be appropriately secured thereto as by the screws 36. The arm 33 is provided with a slot 37 through which extends the bolt 38 whereby the support 34 may be secured in rigid position on the slide. The arm 33 has upwardly projecting portions 39 through which are threaded the adjusting screws 40, the ends of which bear against the support 34, the construction being such that by loosening the bolt 38 the support 34 may be properly adjusted toward and from the path of movement of the upper cutting member. When the parts are in proper adjusted relation the bolts 38 may be set up and a lock nut 41 on the adjusting screws 40 tightened in order to hold the parts in their assembled relation.

In cutting metal sheets it is desirable that the cutting edges of the opposed cutting members shall be relatively inclined in order to produce a shear cut through the metal as the cutting members perform their cutting operations. Where the relatively inclined cutting edges have been straight throughout, however, much difficulty and unsatisfactory results have been experienced where the line of cut to produce the required form has been concave, and a series of short successive actions of the inclined cutting members have produced jagged and uneven surfaces in the concave contour of the cut made. The present invention overcomes this difficulty and these unsatisfactory results by forming the relatively inclined cutting edges of the cutting members of straight and curved portions and by relatively moving a cutting member to selectively render either the straight or curved portions of the cutting members effective in performing the cut.

This feature of the invention is best shown by the enlarged views in Figs. 3, 4 and 5. The lower or anvil cutting member 35 is provided with a straight cutting edge 42 and a concave cutting edge 43 to which the straight portion 42 of the cutting edge is preferably tangent. The opposed cutting member 25 is provided with a cutting edge inclined with respect to the cutting edge of the lower or anvil member and having a straight cutting portion 44 and a convex cutting portion 45 to which the straight cutting portion 44 is correspondingly tangent, as best indicated by Fig. 3. Both straight and convex portions are inclined to the corresponding portions of the member 35. Thus when the power operated cutting member 25 is reciprocated through a predetermined path prescribed by its eccentric, as hereinbefore described, it follows that if the relative positions of the opposed cutting members are changed as by raising or lowering the lower or anvil cutting member, either the straight inclined portions of the opposed cutting edges may be brought into co-acting relation or the opposed convex and concave cutting portions may be rendered effective. In the present instance of the invention, the lower or anvil cutting member 35 is made movable during the operation of the machine into an upper or a lower position relative to the path movement of the upper cutting member. When it is in its upper position the straight inclined cutting portions 42 and 44 of the opposed cutting members co-act to produce either straight or convex curved lines, and when in lower position the convex and concave portions 45 and 43, respectively, are brought into coöperative cutting relation for cutting concave contours in the metal sheets. This change in position of the lower cutting member during the operation of the machine may be variously effected, but in the present instance a treadle operated lever 46 pivoted to the machine frame at 47 and actuated by a suitable treadle through the treadle rod 48 is employed. The treadle lever 46 has a short arm 49 which engages a suitable opening in the slide 30 whereby upon manipulation of the treadle rod 48 the slide 30 and, perforce, the anvil or lower cutting member 35 may be raised to effect the cut by the longitudinally inclined straight cutting portions of the opposed cutting member, or may be lowered to effect the cut by the concave and convex cutting portions of the opposed cutting members. In order to readily take up wear between the parts an adjusting screw 50 may be tapped into a portion of the slide 30 and have its end 51 bearing upon the lower portion of the short arm 49 of the lever 46.

To define the upper and lower positions of the slide 30 and, perforce, the different positions of the lower or anvil cutting member 35 with respect to the predetermined path of movement of the opposed cutting member, suitable stops may be provided. In the present instance of the invention the slide 30 is provided with lugs 52 and 53 in which are threaded the stop screws 54 and 55 respectively, and extending from the guides 27 and 28 are the stop lugs 56 and 57 respectively which coöperate with the stop screws to limit the movement of the slide 30 in either direction. When the lower or anvil cutting member 35 is in its lowered position, as indicated in Figs. 2 and 4, the convex and concave portions of the relatively inclined cutting edges of the opposed cutting members are in coöperating relation, and the upper cutting member 25 moves in its prescribed and predetermined path as indicated by full and dotted lines, Fig. 4, to effect the cut solely by the convex and concave cutting edges of the cutting members. The extreme separation of the cutting edges on the upward stroke will not, preferably, be as great as the thickness of the stock A, so that there will be no danger of the stock slipping through and being damaged by cutting over the desired line. When, however, the lower or anvil cutting member 35 is in its raised position, as determined by the stop screw 55, the opposed cutting members are brought into a different relation so that as the upper cutting member 25 moves in its predetermined path as before, only the straight relatively inclined cutting portions of the cutting edges of the opposed cutting members are brought into operative relation. When, therefore, it is desired to cut a sheet of metal along a straight or convex line, the lower or anvil cutting member, in the present instance of the invention, is raised by the treadle rod 48 into its upper position and the parts are actuated relatively, as indicated by the dotted and full lines, Fig. 5, but when a concave cut is to be made in the metal sheet, the lower or anvil cutting member 35 is dropped to its lower position, as determined by the stop screw 54, and the parts thereupon assume coöperative relation, as indicated by the dotted and full lines, Fig. 4, to bring only the convex and concave portions of the relatively inclined cutting edges of the opposed cutting members into coöperative relation.

Obviously, the opposed cutting members may be held in their slides by any appropriate means, but in the present instance of the invention each of the cutting members is provided with a dove tail side-edge portion for holding it accurately in position and clamping means for securing it in place.

In cutting patterns for shoe uppers and shoe soles from sheet metal, it is desirable that a support or table be provided adjacent the opposed cutting members, and to this end the present invention provides a table or support 58 which may be sustained by a plunger or stem 59 extending through a lug 60 carried by the slide 30. The plunger or stem 59 may be suitably adjusted in its supporting lug 60 and to this end in the present instance of the invention an adjusting screw 61 is provided having a right and left hand thread, the upper portion of which enters a threaded socket in the plunger or stem 59 and the lower portion of which at 62 enters a threaded aperture in an arm 63 carried by the slide 30. The adjusting screw has secured thereto a hand wheel 64 whereby it may be readily rotated for adjusting the table in desired position.

Claims:

1. In a machine for cutting sheet metal, the combination of opposed cutting members having relatively inclined cutting edges, each having a straight and a curved portion, means for relatively reciprocating the cutting members so that the curved portions thereof pass each other at each reciprocation to cut by the curved portions of the cutting edges and means for changing the relation between the cutting members whereby the relative reciprocation causes only the straight portions thereof to pass each other to cut by the said straight portions only.

2. In a machine for cutting sheet metal, the combination of opposed cutting members having relatively inclined cutting edges, each having a straight and a curved portion, means for relatively reciprocating the cutting members so that the curved portions thereof pass each other at each reciprocation to cut by the curved portions of the cutting edges, and means for relatively reciprocating the cutting members so that only the straight portions thereof pass each other to cut by the said straight portions only.

3. In a machine of the class described, the combination of opposed cutting members having relatively inclined cutting edges, one formed of a straight and a convex curved portion, the other of a straight and a concave curved portion, means for relatively reciprocating the cutting members so that the curved portions thereof pass each other at each reciprocation to cut by the curved portions of the cutting edges, and means for changing the relation between the cutting members whereby the relative reciprocation causes only the straight portions thereof to pass each other to cut by the said straight portions only.

4. In a machine of the class described, the combination of opposed cutting members having relatively inclined cutting edges one formed of a straight and a convex curved portion, the other of a straight and a concave curved portion, means for relatively reciprocating the cutting members so that the curved portions thereof pass each other at each reciprocation to cut by the curved portions of the cutting edges, and means for relatively reciprocating the cutting members so that only the straight portions thereof pass each other to cut by the said straight portions only.

5. In a machine of the class described, the combination of two cutting members having relatively inclined cutting edges to effect a shear cut, each having a curved portion and a straight portion, and means for effecting relative reciprocating movement of the cutting members to cause the straight portions only to coact and for effecting movement in a different relation to cause the curved portions to coact.

6. In a machine of the class described, the combination of two cutting members having relatively inclined cutting edges having straight portions terminating in curved portions to which the straight portions are tangential, means for relatively moving the members in a predetermined path to cause only the straight portions of the cutting edges to coact, and means for shifting the position of one of said members to effect the cut by the curved portions of the cutting edges.

7. In a machine of the class described, the combination of two cutting members having relatively inclined cutting edges formed of straight portions terminating in curved portions means for relatively moving the members in a predetermined path to effect the cut and means for changing the relation of the two cutting members at will during the operation of the machine to cause the cut to be made only by the straight portions or only by the curved portions of the cutting edges.

8. In a machine of the class described, the combination of two cutting members having relatively inclined cutting edges formed of straight portions and curved portions, means for relatively moving the two cutting members to effect the cut, and means for changing the relation of the two cutting members at will during the operation of the machine for selectively effecting the cut by the straight or the curved portions of the cutting edges.

9. In a machine of the class described, the combination of opposed cutting members having relatively inclined cutting edges formed of a straight portion and a curved portion at one end of the straight portion, means for moving one of the cutting members in a predetermined path to effect the cut, and manually operable means for shifting the position of the other cutting member at will during the operation of the machine for selectively effecting the cut by the straight or the curved portions of the cutting edges.

10. In a machine of the class described, the combination of opposed cutting members having relatively inclined cutting edges formed of a straight portion and a curved portion at one end of the straight portion, means for moving one of the cutting members in a predetermined path of less extent than the depth of relative inclination of the cutting edges to effect the cut, and manually operable means for shifting the position of the other cutting member at will during the operation of the machine for selectively effecting the cut by the straight or the curved portions of the cutting edges.

11. In a machine of the class described, the combination of two cutting members having relatively inclined cutting edges, the cutting edge of one member comprising a straight portion and a convex portion, the cutting edge of the other member comprising a straight portion and a concave portion, means for moving one of the cutting members in a path of less extent than the depth of relative inclination of the cutting edges to effect the cut, and means for shifting the position of the other cutting member at will during the operation of the machine for selectively effecting the cut by the straight or the curved portions of the cutting edges.

12. In a machine of the class described, the combination of two cutting members having relatively inclined cutting edges, the cutting edge of one member comprising a straight portion and a convex portion, the cutting edge of the other member comprising a straight portion and a concave portion, means for moving one of the cutting members in a path of less extent than the depth of relative inclination of the cutting edges to effect the cut, and treadle operated means for shifting the position of the other cutting member at will during the operation of the machine for selectively effecting the cut by the straight or the curved portions of the cutting edges.

13. In a machine of the class described, the combination of an actuated cutting member having an inclined or slanting cutting edge formed of a straight portion and a convex portion, a stationary cutting member having a cutting edge formed of a straight portion and a concave portion, means for reciprocating the actuated cutting member to effect the cut, and means for shifting the position of the stationary cutting member during the operation of the machine for selectively effecting the cut by the straight or the convex and concave portions of the cutting edges.

14. In a machine for cutting sheet metal, the combination of opposed cutting members having relatively inclined cutting edges, each formed of a straight and a curved portion, and means for operating the cutting members in one relation to effect the cut by the straight portions and in another relation to effect the cut by the curved portions of the cutting edges, and a work table adjacent the cutting members.

15. In a machine of the class described, the combination of an actuated cutting member having an inclined or slanting cutting edge formed of a straight portion and a convex portion, a stationary cutting member having a cutting edge formed of a straight portion and a concave portion, means for reciprocating the actuated cutting member to effect the cut, and a slide carrying the stationary cutting member, the slide being shiftable during the operation of the machine for selectively effecting the cut by the straight or convex and concave portions of the cutting edges.

16. In a machine of the class described, the combination of an actuated cutting member having an inclined or slanting cutting edge formed of a straight portion and a convex portion, a stationary cutting member having a cutting edge formed of a straight portion and a concave portion, means for reciprocating the actuated cutting member to effect the cut, and a slide carrying the stationary cutting member, a table mounted on the slide, the position of the slide being shiftable at will during the operation of the machine for selectively effecting the cut by the straight or the convex and concave portions of the cutting edges.

17. In a machine of the class described, the combination of an anvil knife having a concave cutting edge and a straight edge tangential thereto, and a power driven vertically reciprocating knife having a cutting edge inclined to the cutting edge of the anvil knife and comprising a convex cutting portion and a straight portion tangential thereto, the knives being relatively movable at will during the operation of the machine for selectively effecting the cut by the straight or the convex and concave portions of the cutting edges.

18. In a machine of the class described, the combination of opposed cutting members and means for operating the members to exclude corresponding portions respectively of the cutting edges of the members from cutting coöperation at will.

19. In a machine of the class described, the combination of opposed cutting members having relatively inclined cutting edges, and means for operating the members to effect the cut by the coöperation of different corresponding parts of the cutting members selectively at will.

20. In a machine of the class described, the combination of opposed cutting members having relatively inclined cutting edges, and means for operating one of the members, the other member being positionable to exclude from cutting coöperation corresponding parts of the cutting members at will.

21. In a machine of the class described, the combination of opposed cutting members, each having straight and curved corresponding portions, and means for operating the cutting members to effect the cut by the coöperation of the straight or of the curved portions selectively at will.

In testimony whereof I have signed my name to this specification.

LELAND B. WHIPPLE.